United States Patent [19]
Peterson et al.

[11] Patent Number: 5,169,055
[45] Date of Patent: Dec. 8, 1992

[54] PROCESS OF MANUFACTURING HOLLOW UPPER CONTROL ARM FOR VEHICLE SUSPENSION SYSTEM

[75] Inventors: Robert V. Peterson, Dearborn; William J. McCloskey, Garden City, both of Mich.

[73] Assignee: Masco Industries, Inc., Taylor, Mich.

[21] Appl. No.: 805,608

[22] Filed: Dec. 10, 1991

[51] Int. Cl.⁵ .................... B23K 31/02; B23K 101/28
[52] U.S. Cl. ................... 228/170; 29/897.2; 29/897.35; 228/173.4; 228/173.6
[58] Field of Search ........... 228/173.4, 173.6, 182, 228/170; 29/897.2, 897.35, 897.312

[56] References Cited
U.S. PATENT DOCUMENTS

| | | | |
|---|---|---|---|
| 2,127,618 | 8/1938 | Riemenschneider | 29/897.2 |
| 2,280,016 | 4/1942 | Werdehoff | 29/897.2 |
| 2,640,237 | 6/1953 | Reifsnyder | 29/897.2 |
| 2,784,983 | 3/1957 | Dean | 29/897.2 |
| 3,004,324 | 10/1961 | Macomber | 29/897.35 |
| 3,209,432 | 10/1965 | Cape | 29/897.35 |
| 3,314,673 | 4/1967 | Graney et al. | 267/54 |
| 3,411,803 | 11/1968 | Melton et al. | 280/95 |
| 4,016,950 | 4/1977 | Allison | 29/898.051 |
| 4,192,396 | 3/1980 | Austermann, Jr. et al. | 180/252 |
| 4,468,946 | 9/1984 | Driear | 29/897.35 X |
| 4,732,819 | 3/1988 | Komuro | 428/582 |
| 4,967,473 | 11/1990 | Wessel | 29/897.2 |

Primary Examiner—Kenneth J. Ramsey
Attorney, Agent, or Firm—Edgar A. Zarins; Malcolm L. Sutherland

[57] ABSTRACT

An upper control arm for a vehicle suspension system having a modulus section of hollow construction for reduced weight. The modulus section of the control arm is of a stamped and welded construction thereby eliminating material weight while reducing the cost of manufacturing. The modulus section has a substantially triangular configuration with a reinforced rim flange along the high compression stream area of the control arm elbow. The reinforced rim flange improves the strength of the control arm without sacrificing the weight reduction provided by the hollow construction.

9 Claims, 1 Drawing Sheet

PROCESS OF MANUFACTURING HOLLOW UPPER CONTROL ARM FOR VEHICLE SUSPENSION SYSTEM

BACKGROUND OF THE INVENTION

I. Field of the Invention

This invention relates to an upper control arm for a vehicle suspension system and, in particular, to a control arm having a modulus section of hollow construction with an enlarged rim flange for reinforcement of high load stress areas of the control arm.

II. Description of the Prior Art

Upper control arms are routinely incorporated into the suspension systems of truck and passenger vehicles. The typical control arm is generally U-shaped with a ball joint assembly at the apex of the control arm and pivot bar bushings at the ends of the arm for mounting the control arm to a pivot bar assembly. In the past, the modulus sections between the bushings and the ball joint have been solid sections of cast iron or cast aluminum. It was believed that the traditional cast metal sections were necessary to maintain the integrity of the control arm under the stresses of the suspension system. More recently, the modulus section has been constructed of a steel forging of wire frame design. Although these control arm constructions were strong enough to withstand the stress loads they also were very heavy. In today's vehicle market every aspect of a vehicle is examined for weight reduction.

Recent proposals for reducing the weight of the suspension system include a hollow, two-piece control arm. The square hollow bar section comprises a pair of U-shaped components nested together and double seam welded. Thus, the control arm has double side walls with single upper and lower walls. Although strong and lightweight, the double side walls are not located at the compressive stress areas of the arm where additional strength is required. Moreover, the double seam construction requires precise welding over a curving contour which has not been easy to accommodate. Nevertheless, substantial weight reduction over the solid cross-section of the prior known control arms has been accomplished.

SUMMARY OF THE PRESENT INVENTION

The present invention overcomes the disadvantages of the prior known control arms for vehicle suspension systems by incorporating a modulus section of hollow construction having a substantially triangular configuration in order to distribute the compressive stress loads associated with the suspension system. An enlarged rim flange at the joint apex of the stamped triangular construction provides improved reinforcement at the high compression stress areas of modulus section.

Typical of control arms, the present invention has a substantially U-shaped configuration with a ball joint assembly at the apex and pivot bar bushings at the ends of the control arm. However, the control arm of the present invention includes a modulus section having a substantially triangular hollow cross-section which reduces the overall weight of the control arm while maintaining strength in key stress areas of the elbow sections. The hollow triangular sections are formed through a stamping process wherein the upper apex of the modulus section incorporates a seam weld to form the triangular cross-section. For increased stiffening and reinforcement, an enlarged rim flange is formed along the welded apex seam. This rim flange along the high compression stress ares of the control arm elbow eliminates stress failures along this area and permits double plate FEA modeling resulting in additional load balancing capabilities.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
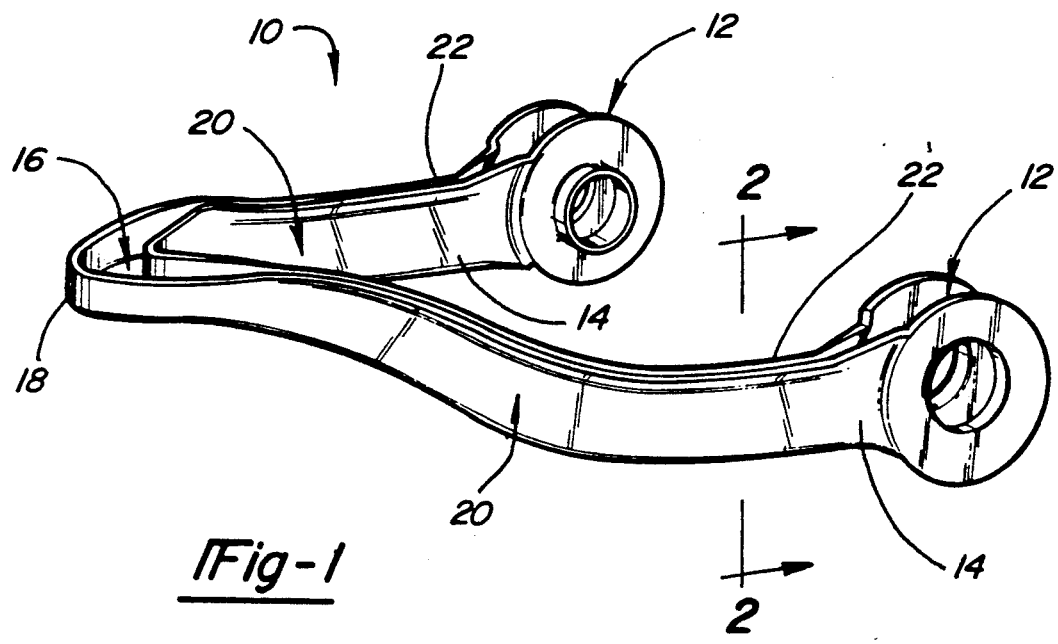
FIG. 1 is an elevated perspective view of a upper control arm for a vehicle suspension system embodying the present invention.
Figure 2:
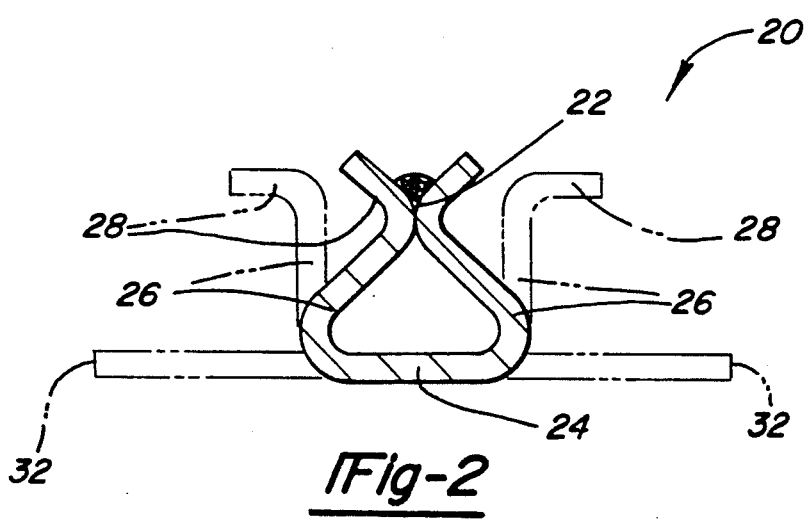
FIG. 2 is a cross-sectional view of the control arm taken along lines 2—2 of FIG. 1.

Referring to FIGS. 1 and 2, there is shown elevational and cross-sectional views of a control arm 10 embodying the principles of the present invention. The control arm 10 is preferably an upper control arm forming a part of a suspension system of a vehicle. As is typical of such components, the control arm 10 has a substantially U-shaped configuration with bushing apertures 12 formed at the ends of the arms 14 and a ball joint receptacle 16 formed at the apex 18 of the control arm 10. The ball joint receptacle 16 is adapted to cooperate with a ball joint assembly (not shown) and may include a ball joint housing integrally formed with the control arm 10. Typical modern control arms 10 incorporate a separate ball joint housing which is inserted into the apex 18 of the control arm 10. The bushing apertures 12 are designed to retain pipe bushings (not shown) for mating engagement with a pivot bar assembly forming a portion of the vehicle suspension system. The pivot bar typically extends through both bushing apertures 12 allowing the control arm 10 to pivot about the assembly in response to road conditions affecting the vehicle suspension system.

The control arm 10 of the present invention is formed of an integral metal stamping to ensure the required structural strength for the suspension system. However, unlike the prior known control arms which incorporate a solid construction, the present invention comprises hollow modulus sections 20 for weight reduction. The control arm 10 includes modulus sections 20 along each arm 14 between the apex 18 and the bushing apertures 12. These modulus sections 20 are subject to extreme compression and tension loads and therefore must have sufficient structural strength to withstand such loads. In order to maintain the structural strength while providing substantial weight reduction, the modulus sections 20 of the control arm 10 of the present invention are provided with a hollow, substantially triangular cross-sectional configuration as best shown in FIG. 2. It has been found that this triangular configuration provides improved strength against the loads while also providing a uniform weld line over the contours of the modulus sections 20 facilitating programmable welding of the seam 22 along the modulus sections 20.

The triangular modulus section 20 includes a bottom wall 24 and a pair of side walls 26 brought into mutual contact to form the seam 22 at the upper apex of the triangular configuration. In a preferred embodiment, the side walls 26 include integral extensions 28 which extend outwardly from the seam 22 to form a reinforcement rim flange 30 for the modulus sections 20. The rim flange 30 has a stiffening effect providing reinforcement of the modulus sections 20 for improved structural strength.

The control arm 10, including the modulus sections 20, is integrally formed from a single metal stamping. Along the modulus sections 20, the stamping includes opposing side edges 32. The substantially flat stamping is first bent to form a U-shaped channel having a bottom wall, a pair of parallel side walls and outwardly extending flanges perpendicular to the side walls. The U-shaped channel is cammed to bring the bends formed at the juncture of the side walls and flanges into mutual contact thereby forming a hollow, substantially triangular cross-sectional configuration. The outwardly extending flanges now form the reinforcement rim flange 30 at the seam 22. The seam is thereafter welded to permanently join the side walls 26 of the modulus section. In order to protect the control arm 10, the completed assembly may be immersed into a coating bath to provide a protective coating interiorly and exteriorly. To further reduce weight while also providing drain holes, the bottom wall 24 may be pierced forming apertures therein. Thus, a reduced weight control arm 10 is formed which has the structural strength to withstand the stress loads associated with the vehicle suspension system.

The foregoing detailed description has been given for clearness of understanding only and no unnecessary limitations should be understood therefrom as some modifications will be obvious to those skilled in the art without departing from the scope and spirit of the appended claims.

What is claimed is:

1. A process of forming the modulus section of a control arm for a vehicle suspension system, said control arm including means for receiving a ball joint assembly at an apex of said control arm and means for receiving a pivot bar assembly at the ends of said control arm, said modulus section formed along each arm between said means, comprising the steps of:
   preforming a one-piece stamping integrally with said control arm, said preformed stamping having opposing side edges;
   bending said preformed stamping to form a substantially U-shaped channel having a bottom wall, a pair of parallel side walls and outwardly extending flanges perpendicular to said side walls, said side walls and said flanges forming first bends therebetween;
   camming said channel to bring said first bends into contact forming a hollow, substantially triangular cross-sectional configuration with outwardly extending flanges at the seam formed along the upper apex thereof; and
   welding said seam to permanently join said first bends, said flanges extending outwardly from said welded seam to form a reinforcement rim flange for said modulus section of the control arm.

2. The process as defined in claim 1 and comprising the further step of piercing said hollow modulus section to form apertures in at least one wall thereof in order to eliminate material and reduce the weight of the control arm.

3. The process as defined in claim 1 and comprising the further step of inserting a reinforcement member into said U-shaped channel prior to camming said channel to form said triangular modulus section, said reinforcement member adding structural strength to the control arm.

4. The process as defined in claim 1 and comprising the further step of immersing the control arm into a coating bath to apply a protective coating to the exterior and interior of said hollow modulus section.

5. A process of forming a control arm for a vehicle suspension system, said control arm adapted to engage a ball joint assembly and a pivot rod assembly and including at least one modulus section for improved structural strength, comprising the steps of:
   stamping an integral one-piece body having a substantially U-shaped configuration with an apex and a pair of arms, said at least one modulus section formed along said arms;
   preforming said body into substantially the elevational contour of said control arm, said preformed body having opposite side edges;
   bending said preformed stamping along the modulus sections of each arm of the body to form a substantially U-shaped channel having a bottom wall, a pair of parallel side walls and outwardly extending flanges perpendicular to said side walls, said side walls and said flanges forming first bends therebetween;
   camming said channel to bring said first bends into contact forming a hollow, substantially triangular cross-sectional configuration with outwardly extending flanges at the seam formed along the upper apex thereby forming said modulus sections along each arm of said body;
   welding said seam to permanently join said first bends, said flanges extending outwardly from said welded seam to form a reinforcement rim flange for said triangular modulus section of the control arm;
   machining said apex of said body to form means for receiving the ball joint assembly; and
   stamping said ends of said arms of said body to form means for receiving the pivot rod assembly.

6. The process as defined in claim 5 wherein said machining step comprises integrally forming a ball joint housing within the control arm for receiving the ball joint assembly.

7. The process as defined in claim 6 and further comprising the step of immersing the control arm into a coating bath to apply a protective coating to the exterior of the control arm and the interior of said hollow modulus section of the control arm.

8. The process as defined in claim 5 wherein said step of stamping said ends of said arms forms at least one aperture within said ends, said apertures receiving bushings for engagement with the pivot rod assembly.

9. The process as defined in claim 5 and further comprising the step of piercing said modulus section to form apertures in at least one wall thereof.

* * * * *